April 12, 1932. W. L. FLEISHER 1,853,853

SYSTEM AND APPARATUS FOR PROOF BOX CONDITIONING

Filed Aug. 8, 1928

INVENTOR.
Walter L. Fleisher
BY
Duell Dunn & Anderson
ATTORNEY

Patented Apr. 12, 1932

1,853,853

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

SYSTEM AND APPARATUS FOR PROOF BOX CONDITIONING

Application filed August 8, 1928. Serial No. 298,212.

This invention relates to methods of and means for producing and controlling temperature and humidity conditions within an enclosure and particularly to a system and apparatus suitable for proof box employ.

The general object of the invention is to provide for the circulation of a given volume of air at a given rate, and to maintain the circulating current at a predetermined dry bulb temperature and relative humidity.

In the proofing of bread, for example, it is desirable, ordinarily, to maintain an average temperature in the proof box of about 93 to 95 degrees. The relative humidity is held at 70%, thus establishing a dew point of about 83 degrees and a wet bulb temperature of about 86 degrees. If no fresh air were admitted or leaked into the system, it is evident that the dew point would rise to 86 degrees and the spray water assume that temperature. However, normal inleakage of fresh air enables proper control to be exercised by thermostatic regulation of the dry bulb temperature and the action of the pump suction. On the other hand, where a dry bulb temperature of 95 degrees is required and a relative humidity much lower than 70%, the problem of thermostatically controlling conditions becomes more difficult. In order to reduce the relative humidity and thus the dew point, much below the said figures, it has heretofore been proposed to shut off the pump which sprays water or to introduce quantities of outside or fresh air within the system.

Applicant proposes controlling a system of this character by automatically regulating the volume and temperature of spray water to obtain a desired relative humidity and to maintain predetermined conditions constant as to wet and dry bulb temperatures and dew point.

A feature of the invention resides in the provision of an automatic control to regulate the level of water in a vaporizing means adapted to serve the system. The dew point is therefore accurately maintained constant for any given condition.

Another feature covers the automatic control of a heating means, preferably of the electric immersion type, for regulating the temperature of the spray water and thus gauging the wet bulb temperature.

A further feature provides for automatically controlling the dry bulb temperature by compensating for inleakage of air and by recirculating the air within the system for any desired period subject to the heater and spray.

Further features for routing the air through the system, for recirculating it through the conditioning apparatus, for atomizing the water in the form of a mist and clearing it of entrained moisture, and for providing other advantages in systems of this character will be more apparent from the following description read in connection with the accompanying drawings illustrating one form of applying the invention, in which:—

Figure 1:
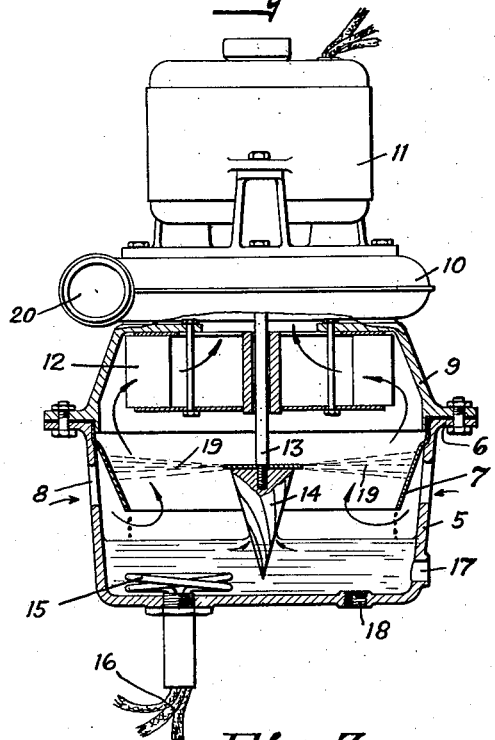
Figure 1 is a view partly in section of a blower and humidifier unit adapted to maintain desired air conditions within a substantially closed circuit system.
Figure 2:
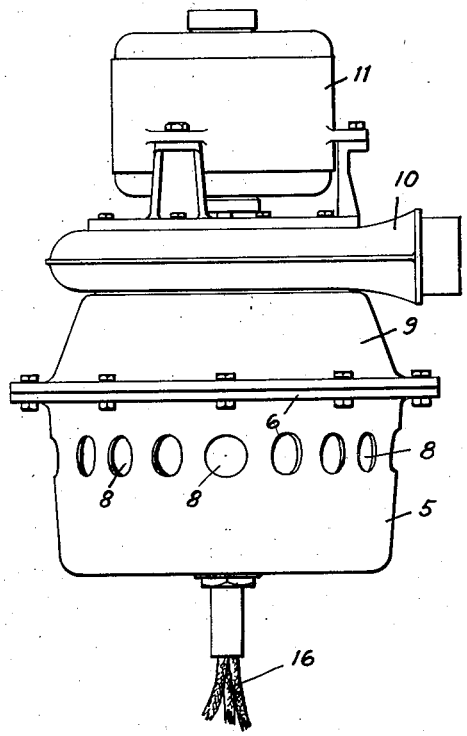
Fig. 2 is a view of the apparatus in Fig. 1 illustrating the outer casing for the vaporizer means, which is adapted to serve as a return duct.

Considering all figures simultaneously, similar designations referring to similar parts, the numeral 5 indicates a humidifier chamber having a flange portion 6 formed to rest upon a supporting surface, as the top of a proof box. The chamber is fitted with an inner surrounding baffle 7 which is supported, as illustrated, contiguous to the flange portion of the chamber. The humidifier chamber is provided with a series of openings 8, and the baffle extends within the chamber to a level below the openings. Fitted to the flange is a cover piece 9 which forms a tight fit at the flange and serves to make the chamber an enclosed unit, except for openings 8. A blower unit 10 is superposed on the cover piece and secured thereto and a motor 11 is connected to a fan within. As a result the humidifier chamber, blower and motor form a compact unit adapted to be positioned in one piece on a proof box or in a similar system.

Within the cover piece is positioned eliminator 12, which consists of a series of baffles. These baffles, in effect, comprise a serrated apron through which air proceeds in its passage to blower 10. Shaft 13, extending from the motor, mounts atomizer or vaporizer 14 which is preferably in the form of a rifled cone, as more particularly outlined in my co-pending application, Serial No. 252,760 filed February 8, 1928. Heater element 15 projects within the humidifier chamber nearer the bottom and is attached to a suitable source of current by leads 16. A source of water is fed within the chamber through inlet 17, and the moisture may be drained through opening 18.

Figure 4:
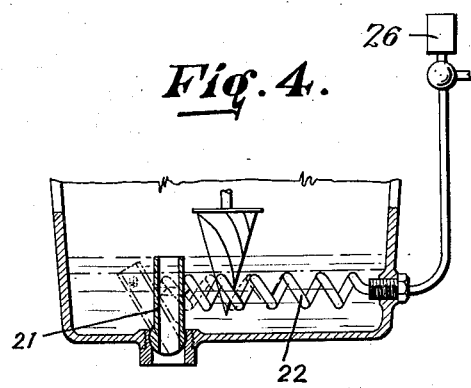
Fig. 4 shows the method of automatically controlling the water level to regulate the wet bulb temperature.

The operation of the humidifier unit results in the revolution, at a desired rate, of the rifled cone within the chamber. The cone, revolving in the water, atomizes the liquid in the form of a spray 19 for humidifying the air which is pulled through the baffles of eliminator 12 by the blower and out through exhaust 20. The heater element will maintain the water in the humidifier chamber at a desired temperature and the cone may be revolved at a predetermined rate. It is apparent that the rate of vaporization may be controlled by the level of the water, inasmuch as the position of the cone remains constant. In Figure 4 applicant illustrates one form of controlling the water level and hence the rate of vaporization. Overflow drain 21 is suitably mounted in a ball bearing which enables it to assume different positions on its seat. By inclining the overflow, its upper extremity will assume different levels with respect to the bottom of the humidifier chamber and hence control the volume of water. As illustrated, the position of the overflow drain may be thermostatically controlled through an expansion and actuating element 22, which may be under the control of a wet bulb thermostat as has been diagrammatically indicated at 26 in Fig. 4. Therefore, if the wet bulb temperature rises above a predetermined limit the overflow drain will be inclined and the water level fall accordingly. When, however, the wet bulb temperature falls sufficiently, the thermostat will concomitantly effect readjustment of the level of the drain so that the water may rise in the humidifier chamber and the wet bulb temperature correspondingly increase.

Figure 3:
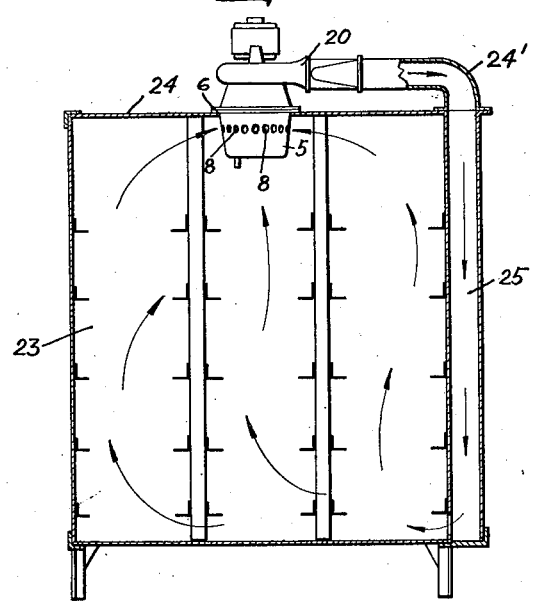
Fig. 3 illustrates a proof box served by the apparatus of Figs. 1 and 2.

Considering the operation of the humidifier in a closed circuit air conditioning system, as for example, in combination with a proof box, Figure 3 illustrates one form of employing the apparatus. Numeral 23 represents a baker's proof box having a top 24 which supports flange 6 of the humidifier unit. Chamber 5 projects within the proof box. Blower exhaust 20 is connected to an outlet 24′ which leads to an intake duct 25 serving the interior of the proof box. The intake duct extends to the bottom of the proof box and has its opening thereat so that products from the conditioner will be discharged within the proof box at its lowermost level. In the operation of the system, air from the interior of the proof box will be drawn within the humidifier chamber through openings 8. The air will then proceed through the spray 19 formed by the rifled cone 14 and then be routed thru and in contact with baffles of eliminator 12, to the blower. In contacting with the baffles the entrained moisture in the air will be precipitated and the air exhausted through the fan will be free from moisture, drops or particles. From the blower exhaust the conditioned air then proceeds to the bottom of the proof box and the operation may be repeated indefinitely. The openings 8 therefore serve as return ducts for the air from the proof box to the humidifier chamber. The baffle 7 effectively guides the recirculated air so that it must proceed through the spray 19 before it is returned to the proof box.

The controls are operative responsive to conditions in the proof box. As already pointed out, a wet bulb thermostat responsive to conditions in the proof box effectively maintains the water level in the humidifier chamber at a desired height, depending upon the wet bulb temperature in the box. If the wet bulb temperature goes up the water level goes down and vice versa. The heater may operate responsive to a dry bulb thermostat and controls the dry bulb temperature responsive to the changes in temperature within the box. The rate of vaporization and the dew point are controlled by the extent to which the cone dips within the water. The fan not only acts as a supply blower to continually recirculate the air and feed the proof box, but also is an exhaust driving the used air from the box and maintaining continual change. The use of an electric immersion heater obviates the necessity of maintaining a steam boiler, which is especially advantageous under summer operating conditions. The automatic control assures a supply of heat in desired quota to be maintained at predetermined temperatures. The automatic maintenance of the water level obviates the necessity for by-passing the water supply or cutting out the pump, and also does not require the addition of quantities of outside air in order to reduce the relative humidity. The apparatus may be compactly designed, is comparatively inexpensive, easy to maintain and effects great saving in initial installation and maintenance.

Thus, among others, the several objects of the invention as specifically aforementioned are achieved. It will be understood that numerous changes in construction and rearrangements of the parts might be resorted to without departing from the spirit of the invention as defined by the claims.

Having described my invention, what I claim as new and desire to secure by Letters Patent is the following:

1. An apparatus of the character described including, in combination, a proof box formed with a pair of openings, means providing a passage connected to one of said openings, a receptacle positioned within and sealing the second of said openings, said receptacle receiving liquid and being formed with an opening for the passage of air, a vaporizer cooperating with such liquid, and means for inducing an air flow through said vapor and through said passage.

2. An apparatus of the character described including, in combination, a proof box formed with a pair of openings, means providing a passage connected to one of said openings, a receptacle positioned within and sealing the second of said openings, said receptacle receiving liquid and being formed with an opening for the passage of air, a vaporizer cooperating with such liquid, means for inducing an air flow through said vapor and through said passage, and means for regulating the volume of vapor through which such air passes and in response to the condition of such air.

3. An apparatus of the character described including, in combination, a proof box formed with a pair of openings, means providing a passage connected to one of said openings, a receptacle positioned within and sealing the second of said openings, said receptacle receiving liquid and being formed with an opening for the passage of air, a vaporizer cooperating with such liquid, means for inducing an air flow through said vapor and through said passage, and means for varying the depth of the liquid in said receptacle and in response to the condition of the air whereby to correspondingly vary the volume of vapor.

4. An apparatus of the character described including, in combination, a proof box formed with a pair of openings, means providing a passage connected to one of said openings, a receptacle positioned within and sealing the second of said openings, said receptacle receiving liquid and being formed with an opening for the passage of air, a vaporizer cooperating with such liquid, means for inducing an air flow through said vapor and through said passage, and means for varying the temperature of the liquid prior to its vaporization.

5. An air conditioning unit including a receptacle to receive liquid, a housing mounted upon said receptacle, a motor fan unit supported by said housing, a vaporizing member immersed within said liquid and operated by said motor, and means responsive to the condition of the air for automatically varying the depth of the liquid within said receptacle.

6. An air conditioning unit including a receptacle to receive liquid, a housing mounted upon said receptacle, a motor fan unit supported by said housing, a vaporizing member immersed within said liquid and coupled to said motor to be operated thereby, a drain member extending within said liquid, and means responsive to the condition of the air for automatically varying the position of said drain member to vary the depth of the liquid.

7. An air conditioning unit including a receptacle to receive liquid, a housing mounted upon said receptacle, a motor fan unit supported by said housing, a vaporizing member immersed within said liquid and coupled to said motor to be operated thereby, said receptacle being formed with an outlet opening, a rockingly mounted overflow tube connected to said opening, and means responsive to the condition of the air for automatically rocking said tube to vary the depth of the liquid within which such vaporizer is working.

In testimony whereof I affix my signature.

WALTER L. FLEISHER.